May 19, 1942.    D. M. LIGHT    2,283,332
FOUR WHEEL TRUCK
Filed Feb. 2, 1940    2 Sheets-Sheet 1
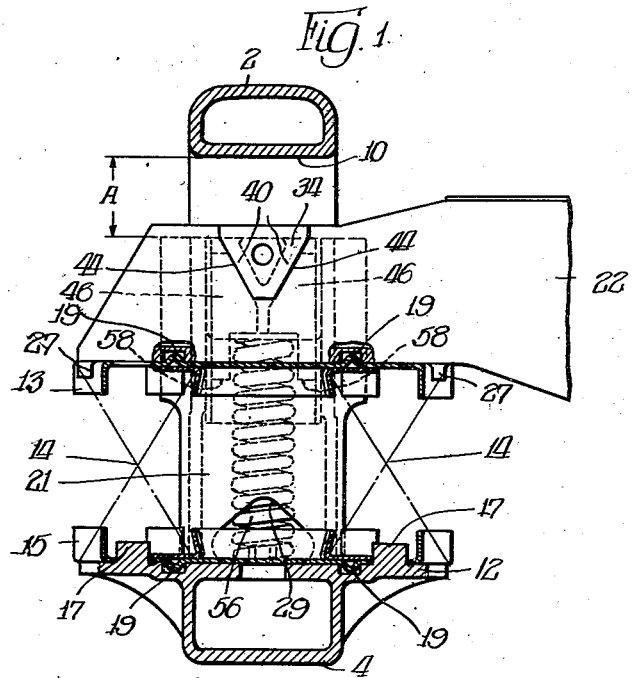
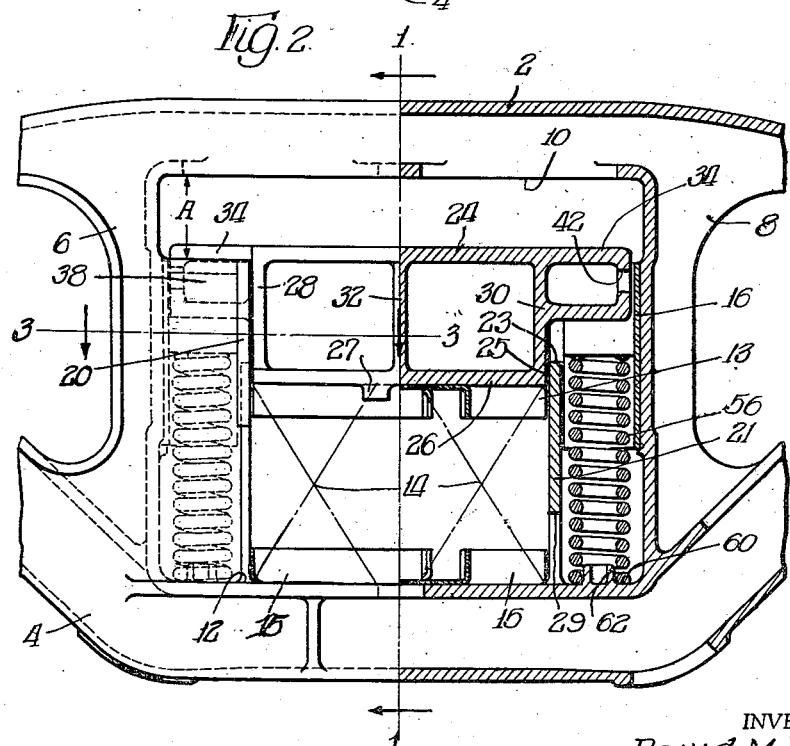
INVENTOR.
David M. Light
BY
ATTORNEY.

May 19, 1942.                D. M. LIGHT                2,283,332
                           FOUR WHEEL TRUCK
                        Filed Feb. 2, 1940              2 Sheets-Sheet 2
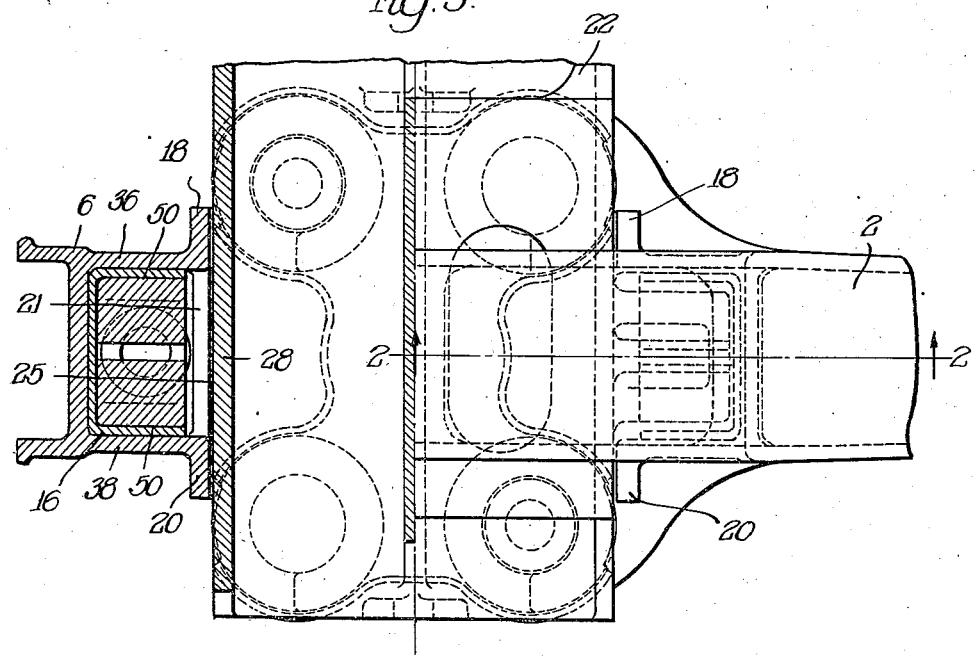
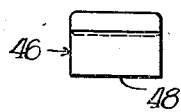
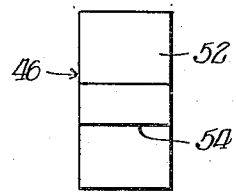
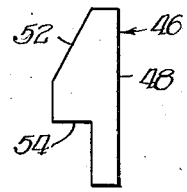
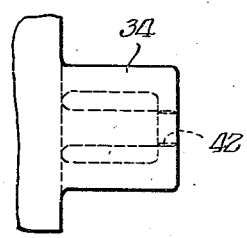
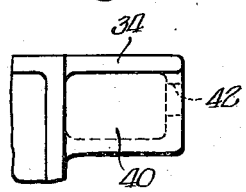
INVENTOR.
David M. Light,
BY
ATTORNEY.

Patented May 19, 1942

2,283,332

UNITED STATES PATENT OFFICE 2,283,332

FOUR-WHEEL TRUCK

David M. Light, Chicago, Ill., assignor to American Steel Foundries, Chicago, Ill., a corporation of New Jersey Application February 2, 1940, Serial No. 316,998

25 Claims. (Cl. 105—197)

My invention relates to railway car trucks and more particularly to a type of railway freight car truck commonly designated a four wheel truck comprising spaced side frames joined by a load carrying member or bolster.

An object of my invention is to devise a novel form of such four wheel truck wherein the form of connection between the side frame and bolster will be particularly helpful in maintaining the parts of the truck in squared relationship.

My invention comprehends an arrangement for supporting the ends of the bolster in the side frame in such manner as to afford friction absorbing capacity in conjunction with resilient support for the ends of the bolster.

A different object of my invention is a novel form of bolster especially adapted for use in my novel form of truck. My invention also includes a novel form of side frame particularly adapted for use with the above-mentioned bolster.

A different object of my invention is a provision of a side frame having column guides of general H shaped cross-section within which may be housed supplementary springs associated with an auxiliary snubbing means.

Yet another object of my invention is a combination of a side frame having column guides of H section within which may be received widened portions of the bolster, the main body of which is afforded guide surfaces at the edges of said columns, said widened bolster portions being afforded wedge shape for engagement with the auxiliary wedge means seated upon said auxiliary springs.

Figure 1 is a sectional view of a four wheel truck embodying my invention, the section being taken substantially in the transverse vertical plane bisecting the truck as indicated by the line 1—1 of Figure 2 and the bolster being shown in elevation.

Figure 2 is a fragmentary side elevation of the truck structure shown in Figure 1, partly in section, the section being taken substantially in the longitudinal vertical plane indicated by the line 2—2 of Figure 3.

Figure 3 is a fragmentary top plan view of the truck structure shown in Figures 1 and 2, partly in section, the section being taken substantially in the horizontal plane indicated by the line 3—3 of Figure 2.

Figure 4 shows a top plan view of one of the wedge blocks, and Figures 4A and 4B are front and side elevations respectively thereof.

Figure 5 is a fragmentary top plan view of the wedge shelf on the bolster, and Figure 5A is a fragmentary elevational view thereof.

Describing the structure in greater detail, my novel truck comprises a side frame commonly designated truss type having the compression member 2 and the tension member 4 joined by the integral columns 6 and 8 and forming therebetween the bolster opening 10. Between the columns 6 and 8, the tension member 4 is widened as best seen in Figure 1 to form the spring seat 12 upon which may be positioned the spring group diagrammatically indicated at 14, 14, said spring group comprising top and bottom spring plates 13 and 15 as well as resilient means of any convenient form, such as steel springs, rubber blocks, or snubbing devices of well-known types depending upon the riding characteristics required in the type of car for which the truck is to afford support.

The spring seat 12 has the upstanding dowels 17, 17 received in openings in the bottom spring plate 15 and serving as means for securely interlocking said plate in position on said seat particularly in a spring plankless truck such as shown. Other positioning bosses 19, 19 are formed on the top and bottom spring plates and received in recesses in the bolster and side frame spring seat respectively, also serving as positioning means for said spring seats.

The columns 6 and 8 are H shaped in cross-section as best seen from the sectional view of Figure 3, and the inwardly directed portions of the columns are afforded the wear plate 16 extending around the inner faces thereof. The inner edges of the columns are afforded inboard and outboard flanges 18 and 20 respectively along the upper portions of the columns serving as spaced guide surfaces for the bolster 22 against each column, the end of said bolster 22 projecting within the bolster opening 10 in the usual manner and being seated upon the spring group already indicated and positioned with respect thereto by the inboard and outboard lugs 27, 27. Centrally of each column the flanges 18 and 20 are tied together by the wall 21, the top of said wall terminating at 23 (Figure 2) sufficiently below the wedge shelves 34 to accommodate normal vertical movement of the bolster. The walls 21 are cored out at the bottom as indicated at 29 and said walls afford additional guide surface against which the bolster may seat as indicated at 25 (Figure 3).

The bolster 22 is of box section comprising the top wall 24, the bottom wall 26, the lateral walls 28 and 30, and the central vertical reinforcing rib 32, the said walls defining a substantially rectangular structure in the common form of a bolster end. Projecting from each lateral wall 28 and 30, however, are the integrally formed wedge shelves 34, 34, the tops of said shelves 34 being formed as a continuation of the top wall 24 of the bolster. The wedge shelves 34, 34 are received between the inboard and outboard walls 36 and 38 of the respective columns, and the tops of the said walls 36 and 38 are spaced from the compression member 2 at the top of the window opening 10 as indicated at A (Figures 1 and 2), the said dimension A being greater than the overall depth of the shelf 34 in order to permit the assembling or dismantling of the bolster with the side frame at the top of the bolster opening. The side walls of the wedge shelf 34 converge downwardly as indicated at 40, 40 (Figure 1), and the end wall of each wedge shelf 34 is afforded a core opening at 42. The tapering side walls of the wedge member 34 have wedge engagement as at 44, 44 (Figure 1) with the wedge blocks 46, 46, each of said wedge blocks having the generally rectangular form shown in Figures 4, 4A, and 4B with the plane friction surface 48 affording a seat for said block as at 50 against the adjacent wear plate 16 which lines the walls of the adjacent column. Each wedge block 46 is afforded a tapering friction surface 52 for engagement with the adjacent side of the wedge shelf 34 at 44 (Figure 1) as already described, and centrally of said wedge block, the shelf 54 affords a seat for the upper end of the auxiliary spring 56, the lower end of each wedge block projecting downwardly beyond the top of said spring as best seen at 58, 58 (Figure 1). The auxiliary spring 56 is substantially housed within the adjacent column and is afforded a seat 60 at the base thereof with positioning means therefor in the form of the upstanding dowel 62.

It will thus be seen that my novel form of connection between the bolster and the side frame of a four wheel truck accommodates a snubbing device at each side of the bolster opening, the wedging angles of which may be adapted to suit the amount of frictional absorption desired between the friction blocks and the wedge shelf of the bolster. My novel arrangement affords also a quick wheel change truck inasmuch as the bolster end may be raised until the wedge members 34 clear the side walls 36 and 38 of the columns at opposite sides of the opening, after which the side frame may be readily removed without disturbing any of the snubbing parts or any of the spring group parts upon which the bolster is seated. My novel arrangement also provides greater than normal squaring facilities between the bolster and the side frame inasmuch as the guide surfaces on the flanges 18 and 20 are widely spaced and will permit a minimum of non-squaring action as constructed. Moreover, the wedge blocks 46 are simple in form and identical and as assembled are so housed within the walls of the columns that the parts are securely held in position against accidental dismantling and even in the case of wedge breakage.

The operation of my novel form of truck will be readily apparent to those skilled in the art. The wedge members 34 integrally formed on the opposite sides of the bolster afford means of urging the wedge blocks 46, 46 into frictional engagement with the wear plates 16, 16 which face the inner walls of the columns, and frictional absorption is afforded along the surfaces 44, 44 as well as along the surfaces 48, 48. The amount of said frictional absorption can be varied by modifying the angles of said wedge surfaces as well as by varying the characteristics of the auxiliary spring 56.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a four wheel truck, a truss side frame having a compression member, a tension member, and spaced columns forming a bolster opening, a spring seat on said tension member beneath said opening, each of said columns having inboard and outboard vertical flanges spaced at their upper ends from said compression member and reflanged along their upper portions to form inboard and outboard bolster guide surfaces, a spring group on said spring seat comprising auxiliary coils housed between said flanges, and a bolster projecting through said opening and seated on said spring group, said bolster comprising wedge members extending between said flanges, and wedge blocks seated on each of said auxiliary springs in engagement with said members, said wedge members having a depth less than the space between said flanges and said compression member, whereby said bolster may be inserted or removed from said bolster opening while said spring group and wedges remain in assembled position.

2. In a four wheel truck, a truss side frame including a compression member, a tension member, and integral columns forming therewith a bolster opening, each of said columns comprising a U section, the inboard and outboard legs whereof are spaced from said compression member and are reflanged to form spaced bolster guide surfaces, wear plates on the inner surfaces of said U section, a spring group on said tension member beneath said opening including auxiliary springs housed within said columns, wedge blocks supported on said auxiliary springs in engagement with said wear plates, and a bolster extending through said opening in inboard and outboard engagement with said guide surfaces, and wedge means projecting from the lateral walls of said bolster between the legs of said U section in frictional engagement with said wedge blocks, said wedge means having a depth less than the distance between said compression member and the tops of said legs, whereby said bolster may be inserted at the top of said opening and seated upon said assembled spring group and wedge blocks.

3. In a four wheel railway truck, a truss side frame having a compression member, a tension member, and spaced H section columns forming therewith a bolster opening, certain of the legs of said H section being directed toward said opening, terminated short of said compression member, and reflanged along their upper portions to form inboard and outboard bolster guide surfaces, a spring group seated on said tension member beneath said opening, a bolster extending through said opening and seated on said spring group, said bolster having wedge brackets extending between said legs, auxiliary springs housed between said legs, and wedge members seated on said auxiliary springs in wedge engagement with said brackets, said wedge brackets having a depth less than the space between the tops of said legs and said compression member, whereby said bolster may be assembled or dismantled while said spring group and wedge blocks are in assembled position in said side frame.

4. In a four wheel truck, a truss side frame having a compression member, a tension member, and spaced columns forming a bolster opening, a spring seat on said tension member beneath said opening, each of said columns having inboard and outboard vertical flanges spaced at their upper ends from said compression member and reflanged along their upper portions to form inboard and outboard bolster guide surfaces, a spring group on said spring seat comprising auxiliary coils housed between said flanges, and a bolster projecting through said opening and seated on said spring group, said bolster comprising wedge members extending between said flanges, and wedge blocks seated on each of said auxiliary springs in engagement with said members, said wedge members having a depth less than the space between said flanges and said compression member, whereby said bolster may be inserted in said opening over said spring group and seated thereon.

5. In a quick wheel change four wheel railway truck, a side frame having a compression member, a tension member, and spaced columns forming therewith a bolster opening, a bolster extending into said opening, said columns having a general H section with the deeper flanges thereof reflanged over a portion of their length to form guide surfaces for said bolster, a spring group on said tension member supporting said bolster and comprising auxiliary springs housed within said columns, the upper ends of said longer legs terminating short of said compression member, said bolster having wedge shelves projecting from the side walls thereof with a depth less than the space between the tops of said flanges and said compression member, whereby said bolster may be inserted in said opening and said wedge shelves seated on said auxiliary springs within said columns.

6. In a four wheel truck, a truss side frame having a compression member, a tension member, and integral H section columns forming therewith a bolster opening, certain flanges of said H sections being directed toward said opening, terminated short of said compression member and reflanged along a portion of their edges to form inboard and outboard bolster guide surfaces, a spring group seated on said tension member beneath said opening and comprising auxiliary springs housed between said flanges, a bolster extending through said opening and having wedge brackets received between said flanges, and wedge blocks seated on said auxiliary springs in wedge engagement with said brackets, said wedge brackets having a depth less than the space between the tops of said flanges and said compression member, whereby said bolster may be inserted or dismantled from the top of said opening while said spring group and said wedge blocks are in assembly.

7. In a four wheel truck, a truss side frame having a compression member, a tension member, and integral columns forming therewith a bolster opening, a spring group seated on said tension member beneath said opening and including auxiliary springs housed in said columns, said columns comprising inboard and outboard flanges reflanged to form inboard and outboard bolster guide surfaces and terminated short of said compression member, a bolster extending through said opening and including wedge brackets extending from the lateral walls thereof and received between said flanges, and wedge blocks seated on said auxiliary springs in frictional engagement with said wedge brackets, said wedge brackets having a depth less than the space between the tops of said flanges and said compression member, whereby said bolster may be inserted into or removed from said opening while said spring group and wedge blocks are in assembly.

8. In a four wheel railway truck, a truss side frame having a compression member, a tension member, and spaced H shaped columns forming therewith a bolster opening, the deeper flanges of said H sections being directed toward said opening and being spaced at their upper ends from said compression member, a bolster projecting into said opening, a spring group seated on said tension member and supporting said bolster and comprising auxiliary springs housed within said columns, wedge blocks seated on said auxiliary springs within said columns, and wedge members projecting from the side walls of said bolster and having a depth less than the space between said flanges and said compression member, whereby said bolster may be inserted in said opening over said spring group and said wedge members seated on said wedge blocks within said columns.

9. In a four wheel truck, a truss side frame including a compression member, a tension member, and integral columns forming therewith a bolster opening, each of said columns comprising a U section, the inboard and outboard legs whereof are reflanged to form spaced bolster guide surfaces, wear plates on the inner surfaces of said U section, a spring group on said tension member beneath said opening including auxiliary springs housed within said columns, inboard and outboard wedge blocks seated on each auxiliary spring in engagement with said wear plates, and a bolster extending through said opening in inboard and outboard engagement with said guide surfaces, said bolster having on its lateral walls wedge brackets each having downwardly converging walls projecting between the legs of the adjacent U section column and between said wedge blocks.

10. In a four wheel truck, a truss side frame having a compression member, a tension member, and spaced columns forming a bolster opening, a spring seat on said tension member beneath said opening, each of said columns having inboard and outboard vertical flanges spaced at their upper ends from said compression member and reflanged along their upper portions to form inboard and outboard bolster guide surfaces, a spring group on said spring seat comprising auxiliary coils housed between said flanges, and a bolster projecting through said opening and seated on said spring group, said bolster comprising wedge members each extending between the adjacent flanges, and laterally disposed wedge blocks seated on each of said auxiliary springs and accommodating the adjacent wedge member therebetween for frictional engagement therewith.

11. In a four wheel railway truck, a truss side frame having a compression member, a tension member, and spaced H section columns forming therewith a bolster opening, certain of the legs of said H sections being directed toward said opening and reflanged along their upper portions to form inboard and outboard bolster guide surfaces, a spring group seated on said tension member beneath said opening, a bolster extending through said opening and seated on said spring group, said bolster including wedge brackets each having converging walls extending between adjacent legs, auxiliary springs housed between said legs, and wedge members seated on each auxiliary spring and urged by the associated wedge bracket into tight frictional engagement with the legs of the adjacent column.

12. In a four wheel truck, a truss side frame having a compression member, a tension member, and integral H section columns forming therewith a bolster opening, certain legs of said H sections being directed toward said opening and reflanged along a portion of their edges to form inboard and outboard bolster guide surfaces, a wall extending between certain of said legs in alignment with said reflanged portions to form additional guide surfaces, a spring group seated on said tension member beneath said opening and comprising auxiliary springs housed within said columns, a bolster extending through said opening and having wedge brackets received between said legs, and wedge blocks seated on each auxiliary spring in wedge engagement with the associated bracket.

13. In a four wheel truck, a truss side frame having a compression member, a tension member, and integral columns forming therewith a bolster opening, a spring group seated on said tension member beneath said opening and including auxiliary springs housed in said columns, said columns comprising inboard and outboard flanges reflanged to form inboard and outboard bolster guide surfaces, a bolster extending through said opening and including wedge brackets each extending from the lateral walls thereof and having downwardly converging walls received between said flanges, and wedge blocks seated on each auxiliary spring in wedge engagement with the converging walls of the associated bracket.

14. In a four wheel truck, a side frame having a compression member, a tension member, and spaced integral columns forming therewith a bolster opening, each of said columns having a general H section with certain legs of said H being reflanged along a portion of their length to form spaced inboard and outboard bolster guide surfaces, the tops of said legs being spaced from said compression member to accommodate the assembly of an associated bolster, and tie means joining said legs on each column intermediate their ends.

15. In a truss side frame, a compression member, a tension member, and integral columns forming therewith a bolster opening, a spring seat on said tension member beneath said opening and extending within said columns, each of said columns having an H section with inboard and outboard legs directed toward said opening and reflanged to form inboard and outboard bolster guide surfaces, and additional bolster guide surfaces formed between said legs in alignment with said first-mentioned guide surfaces, said legs being terminated short of said compression member to accommodate the insertion thereover of an associated bolster member.

16. In a truss side frame, a compression member, a tension member, and integral columns forming therebetween a bolster opening, each of said columns having a general H section for a major portion of its length and extending from said tension member upwardly toward said compression member, certain legs of said H section being reflanged to form inboard and outboard bolster guide surfaces, said legs terminating short of said compression member to accommodate the insertion thereabove of an associated bolster member, and tie means joining said legs and affording bolster guide surfaces.

17. In a four wheel truck, a side frame having a compression member, a tension member, and spaced integral columns forming therewith a bolster opening, each of said columns having a general H section with certain legs of said H being reflanged along a portion of their length to form spaced inboard and outboard bolster guide surfaces, the tops of said legs being spaced from said compression member to accommodate the assembly of an associated bolster, and a wall extending between said legs intermediate their ends.

18. In a truss side frame, a compression member, a tension member, and integral columns forming therewith a bolster opening, a spring seat on said tension member beneath said opening, each of said columns having an H section from said spring seat upwardly with the legs of said H that project toward said opening being terminated short of said compression member to accommodate the insertion thereover of an associated bolster member, and a member extending between said legs affording bolster guide surfaces.

19. In a truss side frame, a compression member, a tension member, and spaced integral columns forming therewith a bolster opening, each of said columns having a general H section for a major portion of its length with certain flanges thereof reflanged to form inboard and outboard bolster guide surfaces at opposite sides of said opening centrally of said columns, each of said columns having a U section above said guide surfaces, and auxiliary guide surfaces extending between said legs in alignment with the guide surfaces on said flanged portions.

20. In a four wheel railway truck, a cast steel bolster having an end portion of box section, and wedge brackets each having downwardly converging friction surfaces extending transversely of said bolster and projecting from the lateral walls thereof.

21. In a truss side frame, a compression member, a tension member, and integral columns forming therewith a bolster opening, a spring seat on said tension member beneath said opening, each of said columns having a generally H section continuous from said spring seat to a point short of said compression member to accommodate the insertion thereof of an associated bolster, and tie means joining inwardly directed legs of said H above said spring seat and affording bolster guide surfaces.

22. In a truss side frame, a compression member, a tension member, and integral columns forming therewith a bolster opening, a spring seat on said tension member beneath said opening, each of said columns having a generally H section continuous from said spring seat to a point short of said compression member to accommodate the insertion thereof of an associated bolster, and spaced inboard and outboard guide surfaces on inwardly directed legs of said H affording squaring means for said bolster, and a wall extending between said legs presenting a guide surface substantially in alignment with said first-mentioned surfaces.

23. In a truss side frame, a compression member, a tension member, and integral columns forming therewith a bolster opening, a spring seat on said tension member beneath said opening, each of said columns having a generally H section continuous from said spring seat to a point short of said compression member to accommodate the insertion thereover of an associated bolster, and bolster guide surfaces formed outwardly of certain legs of said H, and other bolster guide surfaces formed intermediate said legs and lying in substantially the same planes as said first-mentioned guide surfaces.

24. In a railway truck, a cast steel bolster having an end portion of box-section with lateral walls and wedge brackets each having a triangular cross section in a vertical plane extending longitudinally of said bolster and projecting outwardly from said walls.

25. In a railway truck, a truss side frame having a compression member, a tension member, and integral columns forming therewith a bolster opening, a spring group seated on said tension member including auxiliary springs housed within said columns, each column being of generally H section with spaced bolster guide surfaces formed along certain legs thereof, a bolster extending through said opening and maintained in squared relationship with said side frame by engagement with said guide surfaces, wedge members on said bolster, and wedge means seated on each auxiliary spring and adapted to be urged into tight frictional engagement with said legs by the associated wedge member.

DAVID M. LIGHT.